United States Patent
Leung (10) Patent No.: US 9,385,926 B2
(45) Date of Patent: Jul. 5, 2016

(54) SERVICE TEMPLATE GENERATION AND DEPLOYMENT BASED ON SERVICE LEVEL AGREEMENT REQUIREMENTS

(71) Applicant: Intel Corporation, Santa Clara, CA (US)

(72) Inventor: John C. Leung, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 14/367,996

(22) PCT Filed: Dec. 19, 2013

(86) PCT No.: PCT/US2013/076645
§ 371 (c)(1),
(2) Date: Jun. 23, 2014

(87) PCT Pub. No.: WO2015/094299
PCT Pub. Date: Jun. 25, 2015

(65) Prior Publication Data
US 2015/0180736 A1 Jun. 25, 2015

(51) Int. Cl.
*G06F 15/173* (2006.01)
*H04L 12/24* (2006.01)

(52) U.S. Cl.
CPC ........ *H04L 41/5054* (2013.01); *H04L 41/5006* (2013.01)

(58) Field of Classification Search
CPC ................. H04L 41/5054; H04L 41/5006
USPC .................. 709/220, 223, 226, 230
See application file for complete search history.

(56) References Cited

U.S. PATENT DOCUMENTS

| | | | |
|---|---|---|---|
| 7,228,453 B2 | 6/2007 | O'Brien et al. | |
| 2002/0039352 A1* | 4/2002 | El-Fekih et al. | 370/252 |
| 2002/0143920 A1 | 10/2002 | Dev et al. | |
| 2005/0021723 A1* | 1/2005 | Saperia | 709/223 |
| 2008/0255693 A1* | 10/2008 | Chaar et al. | 700/97 |
| 2010/0002722 A1* | 1/2010 | Porat et al. | 370/467 |
| 2012/0011515 A1 | 1/2012 | Jolfaei et al. | |
| 2013/0138812 A1 | 5/2013 | Assuncao et al. | |
| 2013/0151674 A1* | 6/2013 | Weeks | 709/220 |
| 2013/0185667 A1 | 7/2013 | Harper et al. | |
| 2015/0120395 A1* | 4/2015 | Bellini et al. | 705/7.36 |
| 2015/0180736 A1* | 6/2015 | Leung | 709/226 |

OTHER PUBLICATIONS

International Search Report and Written Opinion, International Application No. PCT/US2013/076645, Sep. 17, 2014, 9 pages.

* cited by examiner

*Primary Examiner* — Michael Y Won
(74) *Attorney, Agent, or Firm* — Barnes & Thornburg LLP (57) ABSTRACT

Technologies for generating service templates to achieve service level agreement (SLA) metrics include a service template generator that accesses a generic service template and an SLA metric specification. The generic service template defines a virtual application service to be provided by a datacenter. The service template generator generates one or more specific service templates based on the generic service template. Each of the specific service templates provides one or more of the specified SLA metrics, such as specified uptime, reliability, or manageability. The generated service templates are stored in a service template catalog. A datacenter manager controlling a number of datacenter nodes receives a service request including one or more SLA requirements, selects a matching service template from the service template catalog, and deploys the selected service template. The service template generator and the datacenter manager may be the same device. Other embodiments are described and claimed.

21 Claims, 5 Drawing Sheets

SERVICE TEMPLATE GENERATION AND DEPLOYMENT BASED ON SERVICE LEVEL AGREEMENT REQUIREMENTS

CROSS REFERENCE TO RELATED APPLICATIONS

This application is a national stage entry under 35 USC §371(b) of International Application No. PCT/US2013/076645, which was filed Dec. 19, 2013.

BACKGROUND

Service provider datacenters—such as Internet portal datacenters, cloud datacenters, or legacy datacenters—typically allow customers to install and execute various computing workloads on physical servers operating in a datacenter or distributed across several datacenters. The relationship between the datacenter operator and the customer is typically based on one or more contractual agreements between the customer and the datacenter provider. Those agreements may be known as service level agreements (SLAs), and may define all aspects of the relationship. In particular, a SLA may define technical aspects of the relationship, including the computing services to be provided and the quality of the computing service. Quality factors of the computing service may include performance, reliability, manageability, or other factors. Typical SLAs may not provide quantifiable metrics for quality factors or may merely offer a "best effort" by the datacenter provider to deliver a quality of service.

Datacenter services are typically provided by workloads running on a topology of interconnected compute elements in a datacenter. Those compute elements may be virtual or physical. A service topology typically specifies how to deploy a particular service on a datacenter, and may specify items such as virtual machines, network topology, and the software stack used to deploy the service (e.g., operating system, libraries, support processes, configuration, etc.). For example, a service topology may define the systems and software needed to provide a database, run a web application, or provide a combined service such as a database, web server, and application server. Typical service topologies may specify virtual machine resources without specifying particular physical hardware required to deploy the service. The service topology may be defined in a portable or standardized data format such as the open virtualization format ("OVF"), which has been published by Distributed Management Task Force, Inc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
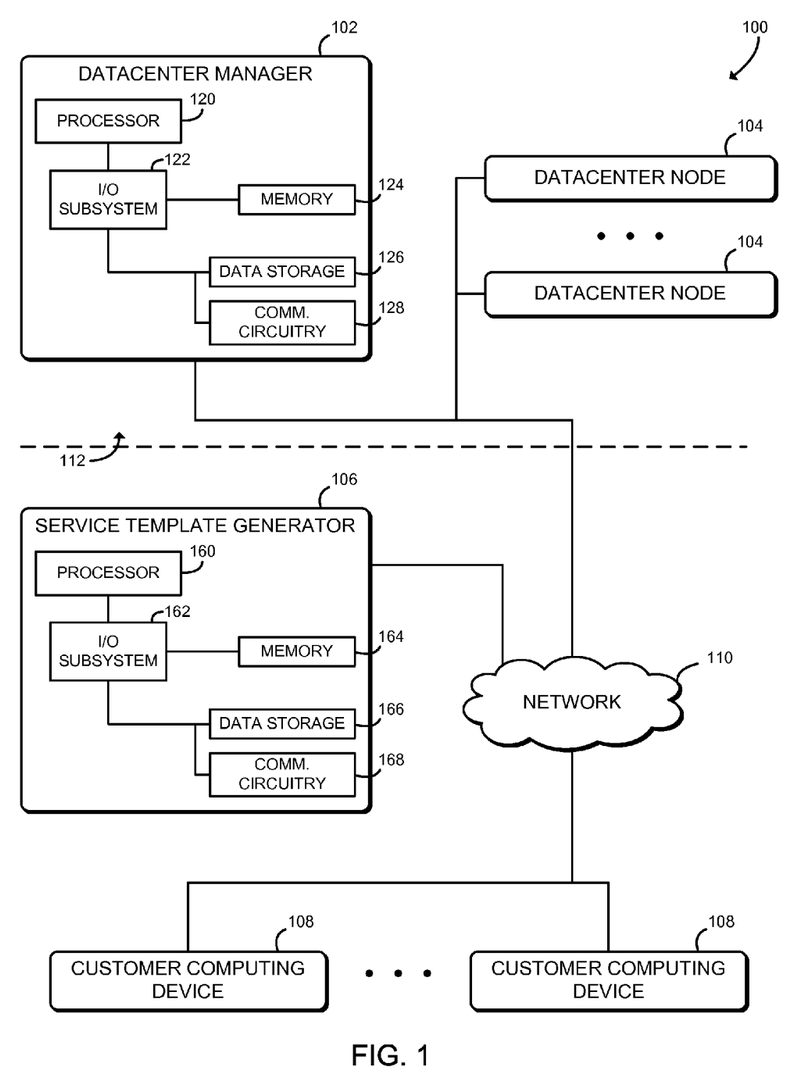
FIG. 1 is a simplified block diagram of at least one embodiment of a system for service template generation and deployment.

Referring now to FIG. 1, in an illustrative embodiment, a system 100 for generation and deployment of service templates includes a datacenter manager 102, a number of datacenter nodes 104, a service template generator 106, and a number of customer computing devices 108, all in communication over a network 110. Additionally, the datacenter manager 102 and the datacenter nodes 104 are included, physically or logically, in a datacenter 112. In use, as discussed in more detail below, the service template generator 106 processes a generic service template for a datacenter service to generate a number of specific service templates, each of which provides the datacenter service with a particular service level agreement (SLA) metric. The service template generator 106 stores the generated service templates in a service catalog for later deployment by the datacenter manager 102. Each of the service templates—general and specific—may be embodied as a definition of a service topology that may be provided by the datacenter 112 to customers. The service templates may define, for example, computing resources, network topology, software, or platform configuration settings to be deployed by the datacenter 112 to provide the service topology. The service templates are described in more detail below. Each SLA metric may define a quantifiable value related to the service to be provided to the customer. For example, the SLA metric may define a particular level of performance; reliability, availability, and serviceability (RAS); security; power consumption; or manageability that may be offered by the datacenter 112 to customers.

Further, in use a customer may send a request to the datacenter manager 102 for a datacenter service that specifies a particular SLA requirement, for example sending the request using a customer computing device 108. In response to the request, the datacenter manager 102 may select a service template from the service catalog that provides the requested SLA requirement, and deploy the selected service template on the datacenter 112 (i.e., instantiate the service on one or more datacenter nodes 104). Additionally or alternatively, if the entity controlling the datacenter 112 decides to expose the service catalog to customers, the customer computing device 108 may request a particular service template from the service catalog. Although this disclosure describes the service template generator 106 as generating the service catalog and the datacenter manager 102 deploying services from the service catalog, it should be understood that in some embodiments those actions may be performed by the same computing device. In addition, in some embodiments the service template generator 106 may provide the service catalog to any number of datacenter managers 102.

The disclosed technologies allow for datacenter providers to better align their SLA offerings to the SLA requirements of their customers. That better alignment of offerings and requirements may improve efficiency, reduce cost, improve utilization of hardware resources, or otherwise improve operations of the datacenter 112. Additionally, automatically generating service templates to achieve particular SLA metrics may allow for system building, configuration, and tuning experience to be captured and reused efficiently. Accordingly, component and platform vendors may be better able to express how their product capabilities may be used to achieve specific SLA metrics.

The datacenter manager 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As such, the datacenter manager 102 may be embodied as a single server computing device or a collection of servers and associated devices. For example, in some embodiments, the datacenter manager 102 may be embodied as a "virtual server" formed from multiple computing devices distributed across the network 110 and operating in a public or private cloud. Accordingly, although the datacenter manager 102 is illustrated in FIG. 1 as embodied as a single server computing device, it should be appreciated that the datacenter manager 102 may be embodied as multiple devices cooperating together to facilitate the functionality described below. As shown in FIG. 1, the illustrative datacenter manager 102 includes a processor 120, an input/output subsystem 122, a memory 124, a data storage device 126, and communication circuitry 128. Of course, the datacenter manager 102 may include other or additional components, such as those commonly found in a server device (e.g., various input/output devices), in other embodiments. Additionally, in some embodiments, one or more of the illustrative components may be incorporated in, or otherwise form a portion of another component. For example, the memory 124, or portions thereof, may be incorporated in one or more processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the datacenter manager 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the datacenter manager 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the datacenter manager 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store service templates, SLA metric specifications, SLA requirements, or other data processed by the datacenter manager 102 as further described below.

The communication circuitry 128 of the datacenter manager 102 may be embodied as any communication circuit, device, or collection thereof, capable of enabling communications between the datacenter manager 102, the datacenter nodes 104 of the datacenter 112, the customer computing device 108, and/or other remote devices over the network 110. The communication circuitry 128 may be configured to use any one or more communication technology (e.g., wired or wireless communications) and associated protocols (e.g., Ethernet, Bluetooth®, WiMAX, etc.) to effect such communication.

Each datacenter node 104 is configured to perform workloads for the datacenter 112 such as virtual machines and/or related hosted applications, and to report on the capabilities of each respective datacenter node 104. Each datacenter node 104 may be embodied as any type of server computing device, or collection of devices, capable of performing the functions described herein. As such, each datacenter node 104 may include components and features similar to the datacenter manager 102, such as a processor, I/O subsystem, memory, data storage, communication circuitry, and various peripheral devices, which are not illustrated in FIG. 1 for clarity of the present description.

The service template generator 106 is configured to generate specific service templates achieving particular SLA requirements. The service template generator 106 may be embodied as any type of server computing device, or collection of devices, capable of performing the functions described herein. Illustratively, the service template generator 106 includes a processor 160, an I/O subsystem 162, a memory 164, a data storage device 166, communication circuitry 168, and/or other components and devices commonly found in a server or similar computing device. Those individual components of the service template generator 106 may be similar to the corresponding components of the datacenter manager 102, the description of which is applicable to the corresponding components of the service template generator 106 and is not repeated herein so as not to obscure the present disclosure.

Each of the customer computing devices 108 may be configured to submit a service request specifying one or more SLA requirements or specifying a particular service template to the datacenter manager 102 of the datacenter 112. Each customer computing device 108 may be embodied as any type of computing device, or collection of devices, capable of performing the functions described herein. Further, each customer computing device 108 may include components and features similar to the datacenter manager 102, such as a processor, I/O subsystem, memory, data storage, communication circuitry, and various peripheral devices, which are not illustrated in FIG. 1 for clarity of the present description.

As discussed in more detail below, the datacenter manager 102, the datacenter nodes 104, and the customer computing devices 108 may be configured to transmit and receive data with each other and/or other devices of the system 100 over the network 110. The network 110 may be embodied as any number of various wired and/or wireless networks. For example, the network 110 may be embodied as, or otherwise include, a wired or wireless local area network (LAN), a wired or wireless wide area network (WAN), a cellular network, and/or a publicly-accessible, global network such as the Internet. As such, the network 110 may include any number of additional devices, such as additional computers, routers, and switches, to facilitate communications among the devices of the system 100.

Figure 2:
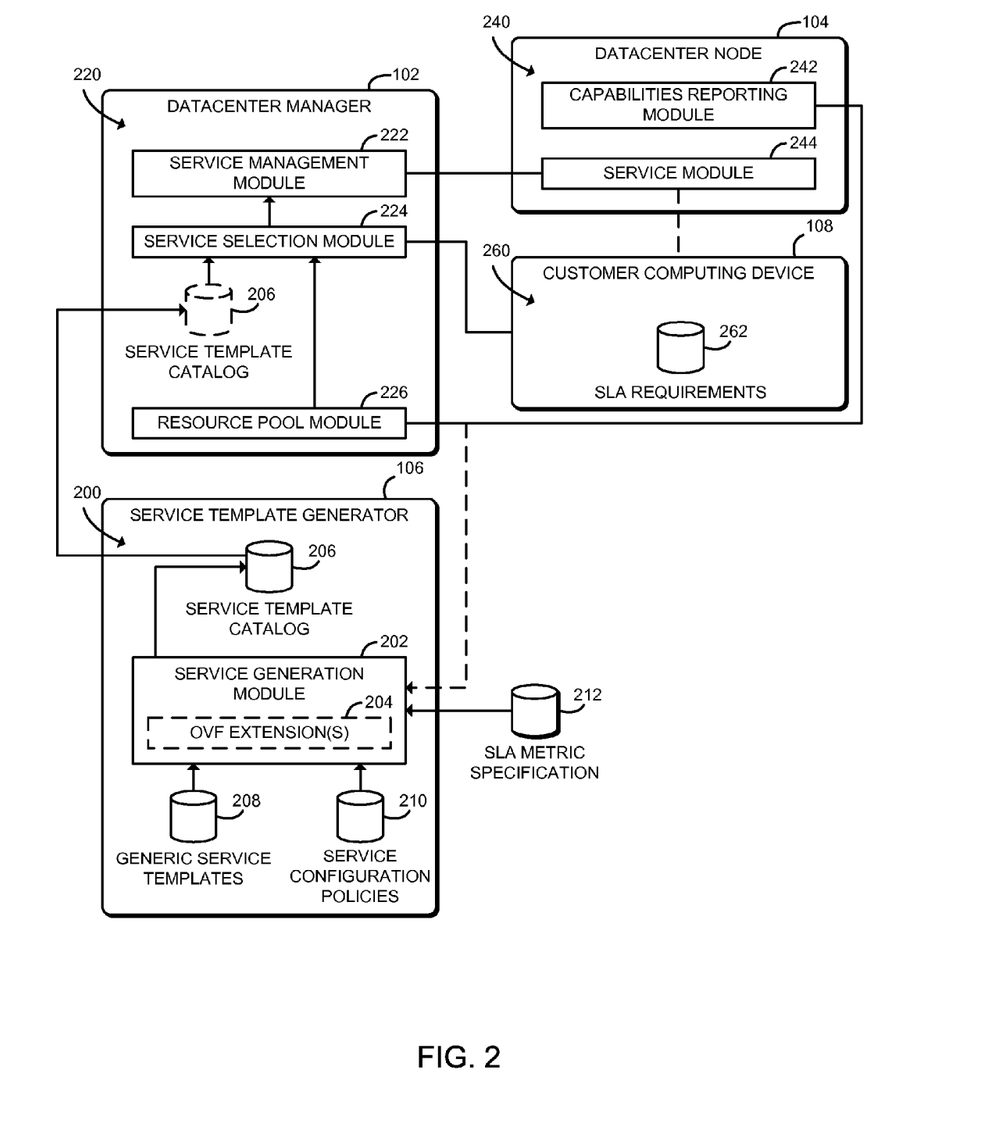
FIG. 2 is a simplified block diagram of at least one embodiment of various environments that may be established by the system of FIG. 1.

Referring now to FIG. 2, in the illustrative embodiment, the service template generator 106 establishes an environment 200 during operation. The illustrative environment 200 includes a service generation module 202. The various modules of the environment 200 may be embodied as hardware, firmware, software, or a combination thereof.

The service generation module 202 is configured to accept as input a generic service template 208, one or more service configuration policies 210, and an SLA metric specification 212, and to produce one or more service templates stored in a service template catalog 206. The generic service template 208 defines a particular service to be provided by the datacenter 112 in terms of generic virtual hardware. For example, the generic service template 208 may define a service topology. The SLA metric specification 212 defines a set of SLA metrics that are to be achieved by the datacenter 112 when providing the specified service. The service configuration policies 210 include rules establishing how a generic service template 208 may be modified or extended to achieve particular SLA metrics. The service template catalog 206 includes service templates specifically configured to achieve particular SLA metrics. The service template catalog 206 may be accessed by the datacenter manager 102 of the datacenter 112. In some embodiments, the generic service templates 208 and/or the service template catalog 206 may be stored in a standardized format such as the open virtualization format (OVF). In some embodiments, the modifications and/or additional definitions stored in the service template catalog 206 may be embodied as one or more OVF extensions 204. That is, a generic service template 208 in standard OVF may be modified, embellished, or otherwise extended by the service generation module 202 to generate a specific service template stored in the service template catalog 206.

Still referring to FIG. 2, in the illustrative embodiment, the datacenter manager 102 establishes an environment 220 during operation. The illustrative environment 220 includes a service management module 222, a service selection module 224, and a resource pool module 226. The various modules of the environment 220 may be embodied as hardware, firmware, software, or a combination thereof.

The resource pool module 226 is configured to determine the available resources of the datacenter 112. Available resources may include the available datacenter nodes 104, available network connections and/or bandwidth, available storage resources, or any other computing resource of the datacenter 112. In some embodiments, the available resources may include details on particular platform hardware features of the datacenter nodes 104. For example, the resource pool module 226 may maintain a list of the datacenter nodes 104 identifying the datacenter nodes 104 by processor architecture, supported instruction set, or other processor feature. In some embodiments, the resource pool module 226 may provide information on available resources of the datacenter 112 to the service generation module 202 of the service template generator 106 during generation of the service templates.

The service selection module 224 is configured to receive a service request from a customer computing device 108 and select a matching service template from the service template catalog 206. The service request may include a number of SLA requirements 262. Each SLA requirement 262 specifies a particular SLA metric that the customer requests the datacenter 112 to provide such as, for example, a particular level of performance, a particular level of reliability, availability, and serviceability (RAS), or a particular level of security. The service selection module 224 queries the service template catalog 206 for service templates that satisfy the provided SLA requirements 262. The service selection module 224 may query the service template catalog 206 (or a subset of the service template catalog 206) stored locally on the datacenter manager 102, remotely on the service template generator 106, or in any combination of local and/or remote queries. The service selection module 224 is also configured to reference the resource pool module 226 in order to select service templates that may be deployed using available resources of the datacenter 112.

The service management module 222 is configured to deploy and manage the service template selected by the service selection module 224. The service management module 222 may instantiate particular virtual machines on one or more datacenter nodes 104 or otherwise configure the datacenter 112 as defined by the selected service template. The service management module 222 may be embodied as any virtualization framework, cloud operating system, or other system to deploy and manage workloads across the datacenter 112.

Still referring to FIG. 2, each datacenter node 104 may establish an environment 240 during operation. The illustrative environment 240 includes a capabilities reporting module 242 and a service module 244. The various modules of the environment 240 may be embodied as hardware, firmware, software, or a combination thereof.

The capabilities reporting module 242 is configured to report the capabilities of the datacenter node 104 to the datacenter manager 102. The capabilities reporting module 242 may report available computing capacity, storage capacity, network capacity, particular hardware features, or any other information usable by the datacenter manager 102 to determine available computing resources of the datacenter 112. The service module 244 is configured to execute particular virtual workloads provided by the datacenter manager 102. The service module 244 may be embodied as any system for executing such workloads, for example as a virtual machine monitor (VMM), hypervisor, virtual machine, operating system, or other workload control system.

Still referring to FIG. 2, each customer computing device 108 may establish an environment 260 during operation. The illustrative environment 260 includes the SLA requirements 262. As described above, the SLA requirements 262 may specify particular SLA metrics that are to be achieved by the datacenter 112. The SLA requirements 262 may be embodied in any computer-readable data format including as a database, structured data, computer file, or any other computer-readable medium.

Figure 3:
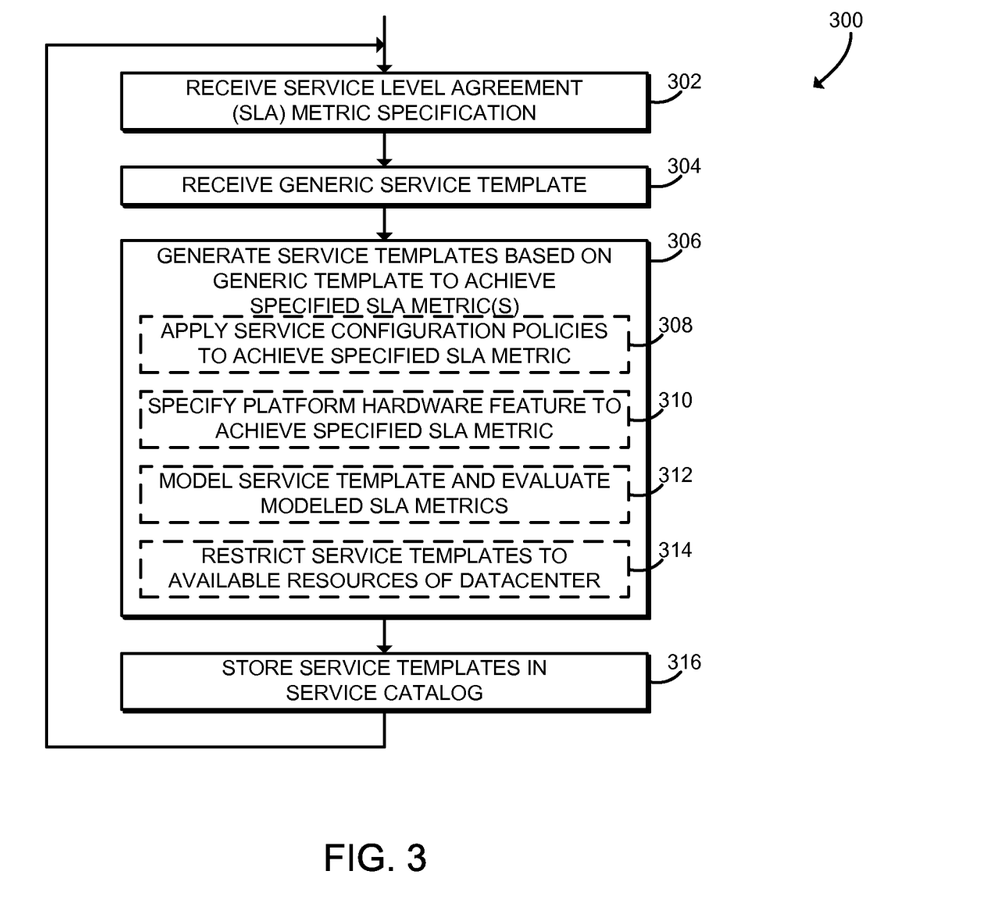
FIG. 3 is a simplified flow diagram of at least one embodiment of a method for generating service templates that may be executed by a datacenter manager of the system of FIGS. 1 and 2.

Referring now to FIG. 3, in use, the service template generator 106 may execute a method 300 for generating service templates. The method 300 begins with block 302, in which the service template generator 106 receives a service level agreement (SLA) metric specification 212. The SLA metric specification 212 defines a set of SLA metrics that are to be achieved by the datacenter 112 when providing a particular service. Each metric of the SLA metric specification 212 may be embodied as any type of criteria that defines an aspect of the service to be provided by the datacenter 112. The metrics may be quantified in any manner appropriate for the particular aspects of the service to be provided. For example, the metrics may be defined in numerical notation (e.g., minimum processor speed, minimum transactions processed per second, average up-time, maximum latency, etc.), in a general or abbreviated notation (e.g., average processor speed, relative availability), or a combination thereof. Additionally, the SLA metric specification 212 may be defined with any appropriate level of specificity. For example, in one embodiment the SLA metric specification 212 may define that the datacenter 112 is to provide either "high" or "regular" availability. Additionally or alternatively, in some embodiments the SLA metric specification 212 may define availability in terms of proportion of time that the datacenter 112 is operable (e.g., "five nines" reliability). The SLA metric specification 212 may be predefined by the entity controlling the datacenter 112, for example by being stored in the data storage 126 of the service template generator 106.

In block 304, the service template generator 106 receives a generic service template 208. The generic service template 208 defines a datacenter service to be performed by the datacenter 112. For example, the generic service template 208 may define a service topology. The generic service template 208 may define the virtual computing resources, virtual network topology, software, or any other virtual configuration required to provide the service. For example, the generic service template 208 may define a virtual server having a single virtual processor running at a particular clock speed (e.g., 1.0 GHz), along with a disk image including the software stack that provides the service (e.g., a web server). However, the generic service template 208 does not define specific platform hardware features or specific hardware used to provide the service. The generic service template 208 may be embodied in any format capable of performing those features; for example, in some embodiments the generic service template 208 may be embodied as an open virtualization format (OVF) package. The generic service template 208 may be provided by the entity controlling the datacenter 112 or by a third party such as a software vendor, system integrator, or hardware manufacturer.

In block 306, the service template generator 106 generates one or more service templates based on the generic service template 208. The generated service templates each achieve particular SLA metrics within the SLA metric specification 212. In some embodiments, the generated service templates may include platform telemetry, monitoring, or other feedback components to allow the datacenter 112 to monitor performance of the service topology and compare against the SLA metric to be achieved. As further described below, the generated service template may later be deployed on the datacenter 112 to satisfy customer requests with particular SLA requirements 262. The service template generator 106 may use any technique to generate service templates to achieve the specified SLA metrics. In some embodiments, in block 308 the service template generator 106 applies the service configuration policies 210 to the generic service template 208 to generate the specific service templates. Each service configuration policy 210 may be embodied as a rule including specific additional modifications, extensions, or other embellishments that, when used in addition to a generic service template 208, achieves a particular SLA metric. For example, each service configuration policy 210 may define one or more system features that may be added as an extension to an existing OVF descriptor and/or OVF package. The service configuration policies 210 may each originate from a different source; for example, different hardware manufacturers may provide service configuration policies 210 appropriate for their respective hardware platforms.

In block 310, in some embodiments the service template generator 106 specifies a particular platform hardware feature to achieve an SLA metric within the SLA metric specification 212. For example, the service template generator 106 may specify particular processor features such as processor architecture, processor instruction set, or a processor security and/or isolation feature such as trusted execution capability or extended page tables. Accordingly, rather than the virtual processor defined by the generic service template 208, a specific service template may specify a processor that supports particular instruction set extensions or that provides particular security features. Additionally or alternatively, the service template generator 106 may specify an I/O capability such as single-root I/O virtualization (SR-IOV), or a disk feature such as available bandwidth.

In block 312, in some embodiments the service template generator 106 may model the specific service template and evaluate the SLA metrics. For example, the service template generator 106 may configure a service based on a proposed service template and then simulate that service. The service template generator 106 may evaluate the simulation to determine if the desired SLA metrics were achieved by the service. Last, in block 314 in some embodiments the service template generator 106 may restrict the generated service templates to available resources of the datacenter 112. For example, the service template generator 106 may query the resource pool of the datacenter manager 102 for a snapshot of datacenter resources to determine the platform hardware features available on the datacenter nodes 104. Of course, the service templates may be generated regardless of available resources, for example by a vendor or a hardware manufacturer.

In block 316, the service template generator 106 stores the generated service templates in the service template catalog 206. In some embodiments, the service template generator 106 may also store the generic service template 208 in the service template catalog 206. As described further below, the service template catalog 206 may be queried by the datacenter manager 102 in response to a customer service request. After storing the service templates, the method 300 loops back to block 302 to generate additional service templates.

Although illustrated in FIG. 3 as occurring on a single computing device, it should be understood that service templates may be generated in several passes by different computing devices or entities. For example, a hardware vendor, software vendor, or platform integrator may generate service templates and populate the service template catalog 206 based on the products offered by that vendor. Continuing the example, a datacenter operator may receive the populated service template catalog 206 and then generate additional service templates or refine the existing service templates based on the available resources of the datacenter 112.

Figure 4:
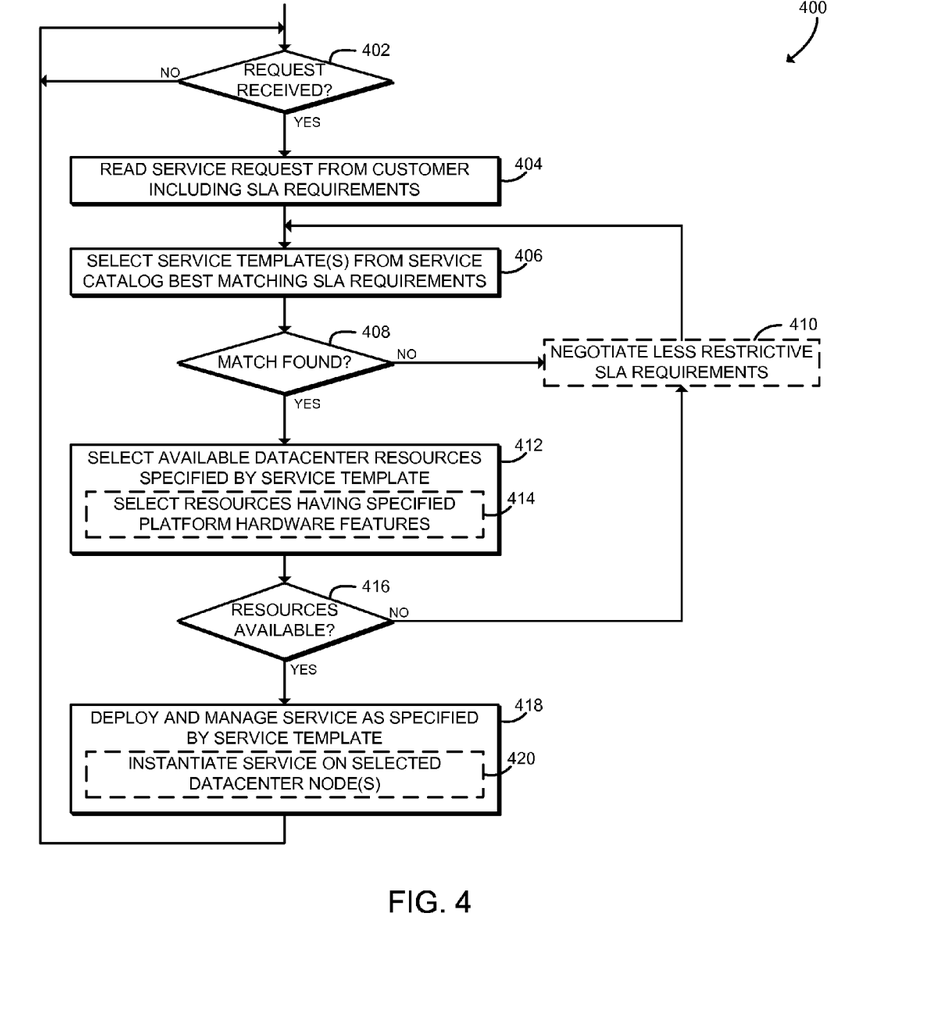
FIG. 4 is a simplified flow diagram of at least one embodiment of a method for deploying a service template that may be executed by the datacenter manager of the system of FIGS. 1 and 2.

Referring now to FIG. 4, in use, the datacenter manager 102 may execute a method 400 for deploying service templates. The method 400 begins in block 402, in which the datacenter manager 102 determines whether a request for a service has been received. A service request represents a customer requesting the datacenter 112 to provide a particular service, and may originate from an entity other than the entity controlling the datacenter 112. In some embodiments, the service request may be received over the network 110 from a customer computing device 108. Additionally or alternatively, the service request may be received locally, for example through a management console of the datacenter manager 102. If no request was received, the method 400 loops back to block 402 to continue monitoring for requests. If a request was received, the method 400 advances to block 404.

In block 404, the datacenter manager 102 reads the service request from the customer including any SLA requirements 262 provided with the request. The SLA requirements 262 provided with the service request represent particular SLA metrics that the customer requests the datacenter 112 to achieve. For example, the SLA requirements 262 may specify a particular level of performance; reliability, availability, and serviceability; security, power consumption; manageability; or any combination of those requirements to be provided by the datacenter 112.

In block 406, the datacenter manager 102 queries the service template catalog 206 to select specific service templates that best match the provided SLA requirements 262. The datacenter manager 102 may select service templates that provide SLA metrics corresponding to the requested SLA requirements 262; that is, SLA metrics that meet or exceed the SLA requirements 262. The datacenter manager 102 may query a copy or subset of the service template catalog 206 stored within or accessible to the datacenter 112. For example, the datacenter manager 102 may query a subset of the service template catalog 206 based on resources of the datacenter 112. Additionally or alternatively, the datacenter manager 102 may query the service template catalog 206 provided by or hosted by the service template generator 106.

In block 408, the datacenter manager 102 determines whether any matching service templates have been found. If at least one matching service template has been found, the method 400 advances to block 412, described below. If no matching service templates have been found, the method 400 branches to block 410. In block 410, in some embodiments the datacenter manager 102 may negotiate with the customer for updated SLA requirements 262 including less restrictive SLA metrics. Such less restrictive SLA requirements 262 may be achievable by more service templates of the service template catalog 206. For example, if the customer's desired level of availability may not be achieved using service templates in the service template catalog 206, the datacenter manager 102 may propose a level of availability that is achievable. The negotiation may be performed automatically between the datacenter manager 102 and a customer computing device 108, or may include user interaction from a representative of the customer. Additionally or alternatively, the customer may be directed toward another datacenter 112 capable of achieving the customer's desired level of service, for example through a third-party broker service. After negotiation, the method 400 loops back to block 406 to attempt to select matching service templates. If the negotiation is not successful or not attempted, the method 400 may signal an error condition or otherwise terminate processing the service request (not shown).

Referring back to block 408, if at least one matching service template was found, the method 400 advances to block 412. In block 412, the datacenter manager 102 selects available resources of the datacenter 112 that are specified by a matching service template. If more than one matching template has been found, the datacenter manager 102 may select a best match of the service templates using any appropriate criteria. In some embodiments, the datacenter manager 102 may negotiate with the customer regarding additional capabilities either at the time of the service request or at a later time. The datacenter manager 102 may select available resources including datacenter nodes 104, network connections, storage resources, or other resources defined in the selected service template. In some embodiments, in block 414 the datacenter manager 102 may select resources having platform hardware features specified by the service template. For example, the datacenter manager 102 may select datacenter nodes 104 having specified processor features such as a particular processor architecture, supporting a particular processor instruction set, or having particular processor security and/or isolation features such as trusted execution capability or extended page tables.

In block 416, the datacenter manager 102 determines whether resources are available in the datacenter 112 for the selected service template. Although illustrated as occurring sequentially, in some embodiments the selection of service templates and available resources may occur substantially contemporaneously. For example, the datacenter manager 102 may immediately reserve all resources required for the matching service template for a short time (e.g., the time required to process the service request) upon selection of that service template. If resources are available, the method 400 advances to block 418, described below. If resources are not available, the method 400 branches to block 410 and in some embodiments may negotiate updated SLA requirements 262 with less restrictive SLA metrics. As described above, less restrictive SLA requirements 262 may be capable of running on a wider variety of resources of the datacenter 112, for example by dropping specific platform hardware features.

Referring back to block 416, if resources are available, the method 400 advances to block 418, in which the datacenter manager 102 deploys and manages the service as specified by the service template, using the available datacenter 112 resources. The datacenter manager 102 may use any virtualization system, cloud operating system, or other management system to deploy and manage the services. In some embodiments, in block 420 the datacenter manager 102 may instantiate the service template on selected datacenter nodes 104 of the datacenter 112. For example, the datacenter manager 102 may cause virtual machines specified by the service template to be created and executed by particular datacenter nodes 104. After deploying the service, the method 400 loops back to block 402 to monitor for additional service requests.

Figure 5:
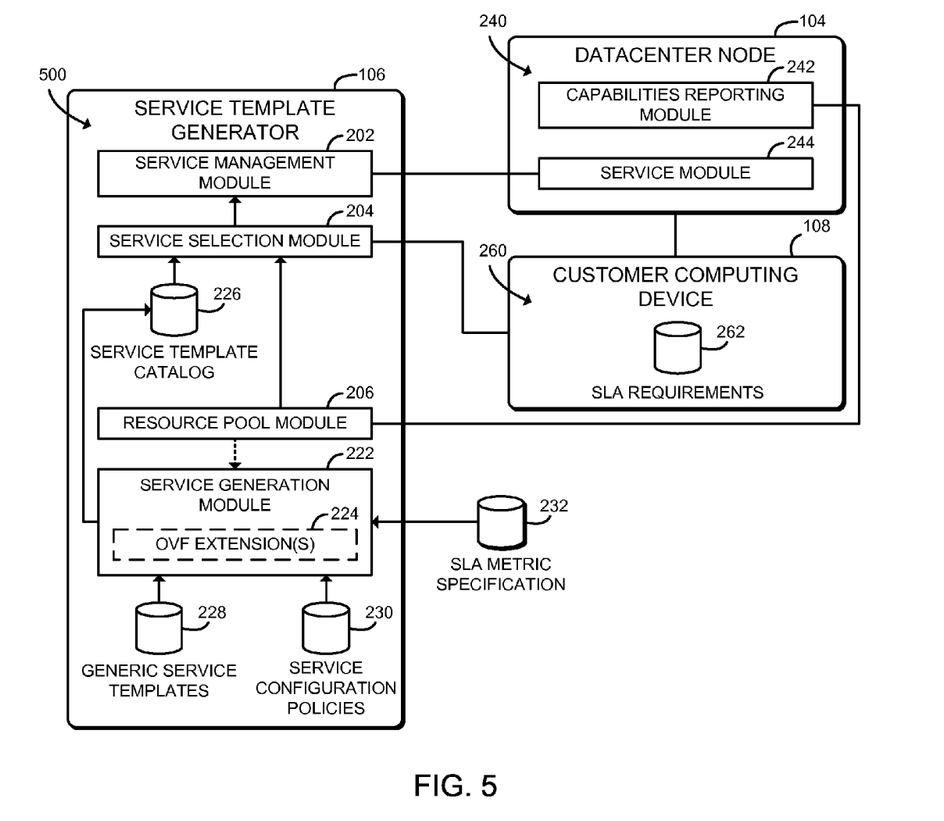
FIG. 5 is a simplified block diagram of at least one embodiment of various environment that may be established by the system of FIG. 1

Referring now to FIG. 5, in some embodiments, the functions of the datacenter manager 102 and the service template generator 106 described above may be consolidated in a single server computing device or collection of computing devices. In one such embodiment, the service template generator 106 may establish an environment 500 during operation. The illustrative environment 500 includes the service generation module 202, the service management module 222, the service selection module 224, and the resource pool module 226. Those modules perform the same functions as described above with respect to the datacenter manager 102 and the service template generator 106 of FIG. 2. In such embodiments, the datacenter node 104 may establish the environment 240 and each customer computing device 108 may establish the environment 260 as described above with respect to FIG. 2. Thus, in such embodiments, the datacenter manager 102 may perform the operations described above with respect to both the method 300 of FIG. 3 and the method 400 of FIG. 4. The various modules of the environment 500 may be embodied as hardware, firmware, software, or a combination thereof. It should be understood that, although illustrated in FIG. 5 as being consolidated in the service template generator 106, in some embodiments the functions described may be consolidated in the datacenter manager 102.

EXAMPLES

Illustrative examples of the technologies disclosed herein are provided below. An embodiment of the technologies may include any one or more, and any combination of, the examples described below.

- Example 1 includes a service template generator for managing service templates, the service template generator comprising a service generation module to access a generic service template, the generic service template defining a service topology to be provided by one or more datacenter nodes of a datacenter; access a service level agreement (SLA) metric specification, the SLA metric specification specifying a set of SLA metrics to be achieved by the service topology; and generate one or more specific service templates based on the generic service template, each of the specific service templates to provide an SLA metric within the set of SLA metrics of the SLA metric specification; and a service template catalog to store the one or more specific service templates, the service template catalog to be accessible to the datacenter.
- Example 2 includes the subject matter of Example 1, and wherein each of the specific service templates defines one or more of: computing resources, network topology, software, or platform configuration settings to be deployed by the datacenter to provide the service topology.
- Example 3 includes the subject matter of any of Examples 1 and 2, and wherein the set of SLA metrics comprises one or more performance, reliability, availability, and serviceability, security, power consumption, or manageability metrics to be achieved by the service topology.
- Example 4 includes the subject matter of any of Examples 1-3, and wherein the set of SLA metrics comprises uptime, reliability, response latency, bandwidth, transactions per reference time period, or redundancy.
- Example 5 includes the subject matter of any of Examples 1-4, and wherein to generate the one or more specific service templates comprises to specify a platform hardware feature of a datacenter node.
- Example 6 includes the subject matter of any of Examples 1-5, and wherein the platform hardware feature comprises a processor architecture, an instruction set, a virtual I/O capability, a trusted execution capability, a cache size, a processor security feature, or a disk I/O capability.
- Example 7 includes the subject matter of any of Examples 1-6, and wherein the platform hardware feature comprises a computing resource, a network topology, or a storage resource.
- Example 8 includes the subject matter of any of Examples 1-7, and wherein to generate the one or more specific service templates comprises to apply a service configuration policy to the generic service template to achieve the SLA metric within the set of SLA metrics of the SLA metric specification.
- Example 9 includes the subject matter of any of Examples 1-8, and wherein to generate the one or more specific service templates further comprises to model the service topology based on the service configuration policy applied to the generic service template; determine a modeled SLA metric based on the modeled service topology; and compare the modeled SLA metric to the set of SLA metrics of the SLA metric specification.
- Example 10 includes the subject matter of any of Examples 1-9, and wherein to generate the one or more specific service templates comprises to modify the generic service template with an additional datacenter requirement.
- Example 11 includes the subject matter of any of Examples 1-10, and wherein to modify the generic service template comprises to extend an open virtualization format (OVF) package or an OVF descriptor associated with the generic service template.
- Example 12 includes the subject matter of any of Examples 1-11, and further including a resource pool module to determine available resources of the datacenter; wherein to generate the one or more specific service templates comprises to restrict the specific service templates to the available resources of the datacenter.
- Example 13 includes the subject matter of any of Examples 1-12, and further including a service selection module to (i) receive a service request including an SLA requirement and (ii) select a service template from the service template catalog based on the service request, the selected service template to provide an SLA metric corresponding to the SLA requirement of the service request; and a service management module to deploy the selected service template using available resources of the datacenter.
- Example 14 includes the subject matter of any of Examples 1-13, and wherein the service selection module is further to determine whether any service templates providing an SLA metric corresponding to the SLA requirement exist in the service template catalog; and negotiate an updated SLA requirement with a customer computing device in response to a determination that no service templates providing the SLA metric corresponding to the SLA requirement exist in the service template catalog, wherein the updated SLA requirement includes a reduced SLA metric to be provided by the service topology relative to the SLA requirement of the service request.

Example 15 includes the subject matter of any of Examples 1-14, and wherein the service selection module is further to determine whether more than one service template providing an SLA metric corresponding to the SLA requirement of the service request exists in the service template catalog; and negotiate an updated SLA requirement with a customer computing device in response to a determination that more than one service template providing the SLA metric corresponding to the SLA requirement exists in the service template catalog, wherein the updated SLA requirement includes an increased SLA metric to be provided by the service topology relative to the SLA requirement of the service request.

Example 16 includes the subject matter of any of Examples 1-15, and further including a resource pool module to determine whether resources specified by the selected service template are available in the datacenter; wherein to deploy the selected service template using the available resources of the datacenter comprises to deploy the selected service template in response to a determination that the resources specified by the selected service template are available in the datacenter.

Example 17 includes the subject matter of any of Examples 1-16, and wherein the service selection module is further to negotiate an updated SLA requirement with a customer computing device in response to a determination that the resources specified by the selected service template are not available in the datacenter, wherein the updated SLA requirement includes a reduced SLA metric to be provided by the service topology relative to the SLA requirement of the service request.

Example 18 includes the subject matter of any of Examples 1-17, and wherein to determine whether the resources specified by the selected service template are available in the datacenter comprises to determine whether a datacenter node is available in the datacenter.

Example 19 includes the subject matter of any of Examples 1-18, and wherein to determine whether the datacenter node is available comprises to determine whether a datacenter node having a platform hardware feature specified by the selected service template is available in the datacenter.

Example 20 includes a method for managing service templates, the method comprising accessing, by a service template generator, a generic service template, the generic service template defining a service topology to be provided by one or more datacenter nodes of a datacenter; accessing, by the service template generator, a service level agreement (SLA) metric specification, the SLA metric specification specifying a set of SLA metrics to be achieved by the service topology; generating, by the service template generator, one or more specific service templates based on the generic service template, each of the specific service templates to provide an SLA metric within the set of SLA metrics of the SLA metric specification; and storing, by the service template generator, the one or more specific service templates in a service template catalog, the service template catalog to be accessible to the datacenter.

Example 21 includes the subject matter of Example 20, and wherein each of the specific service templates defines one or more of: computing resources, network topology, software, or platform configuration settings to be deployed by the datacenter to provide the service topology.

Example 22 includes the subject matter of any of Examples 20 and 21, and wherein the set of SLA metrics comprises one or more performance, reliability, availability, and serviceability, security, power consumption, or manageability metrics to be achieved by the service topology.

Example 23 includes the subject matter of any of Examples 20-22, and wherein the set of SLA metrics comprises uptime, reliability, response latency, bandwidth, transactions per reference time period, or redundancy.

Example 24 includes the subject matter of any of Examples 20-23, and wherein generating the one or more specific service templates comprises specifying a platform hardware feature of a datacenter node.

Example 25 includes the subject matter of any of Examples 20-24, and wherein the platform hardware feature comprises a processor architecture, an instruction set, a virtual I/O capability, a trusted execution capability, a cache size, a processor security feature, or a disk I/O capability.

Example 26 includes the subject matter of any of Examples 20-25, and wherein the platform hardware feature comprises a computing resource, a network topology, or a storage resource.

Example 27 includes the subject matter of any of Examples 20-26, and wherein generating the one or more specific service templates comprises applying a service configuration policy to the generic service template to achieve the SLA metric within the set of SLA metrics of the SLA metric specification.

Example 28 includes the subject matter of any of Examples 20-27, and wherein generating the one or more specific service templates further comprises modeling the service topology based on the service configuration policy applied to the generic service template; determining a modeled SLA metric based on modeling the service topology; and comparing the modeled SLA metric to the set of SLA metrics of the SLA metric specification.

Example 29 includes the subject matter of any of Examples 20-28, and wherein generating the one or more specific service templates comprises modifying the generic service template with an additional datacenter requirement.

Example 30 includes the subject matter of any of Examples 20-29, and wherein modifying the generic service template comprises extending an open virtualization format (OVF) package or an OVF descriptor associated with the generic service template.

Example 31 includes the subject matter of any of Examples 20-30, and further including determining, by the service template generator, available resources of the datacenter; wherein generating the one or more specific service templates comprises restricting the specific service templates to the available resources of the datacenter.

Example 32 includes the subject matter of any of Examples 20-31, and further including receiving, by the service template generator, a service request including an SLA requirement; selecting, by the service template generator, a service template from the service template catalog based on the service request, the selected service template to provide an SLA metric corresponding to the SLA requirement of the service request; and deploying, by the service template generator, the selected service template using available resources of the datacenter.

Example 33 includes the subject matter of any of Examples 20-32, and further including determining, by the service template generator, whether any service templates providing an SLA metric corresponding to the SLA requirement exist in the service template catalog; and negotiating, by the service template generator, an updated SLA requirement with a customer computing device in response to determining that no service templates providing the SLA metric corresponding to the SLA requirement exist in the service template catalog, wherein the updated SLA requirement includes a reduced SLA metric to be provided by the service topology relative to the SLA requirement of the service request.

Example 34 includes the subject matter of any of Examples 20-33, and further including determining, by the service template generator, whether more than one service template providing an SLA metric corresponding to the SLA requirement of the service request exists in the service template catalog; and negotiating, by the service template generator, an updated SLA requirement with a customer computing device in response to determining that more than one service template providing the SLA metric corresponding to the SLA requirement exists in the service template catalog, wherein the updated SLA requirement includes an increased SLA metric to be provided by the service topology relative to the SLA requirement of the service request.

Example 35 includes the subject matter of any of Examples 20-34, and further including determining, by the service template generator, whether resources specified by the selected service template are available in the datacenter; wherein deploying the selected service template using the available resources of the datacenter comprises deploying the selected service template in response to determining that the resources specified by the selected service template are available in the datacenter.

Example 36 includes the subject matter of any of Examples 20-35, and further including negotiating, by the service template generator, an updated SLA requirement with a customer computing device in response to determining that the resources specified by the selected service template are not available in the datacenter, wherein the updated SLA requirement includes a reduced SLA metric to be provided by the service topology relative to the SLA requirement of the service request.

Example 37 includes the subject matter of any of Examples 20-36, and wherein determining whether the resources specified by the selected service template are available in the datacenter comprises determining whether a datacenter node is available in the datacenter.

Example 38 includes the subject matter of any of Examples 20-37, and wherein determining whether the datacenter node is available comprises determining whether a datacenter node having a platform hardware feature specified by the selected service template is available in the datacenter.

Example 39 includes a computing device comprising a processor; and a memory having stored therein a plurality of instructions that when executed by the processor cause the computing device to perform the method of any of Examples 20-38.

Example 40 includes one or more machine readable storage media comprising a plurality of instructions stored thereon that in response to being executed result in a computing device performing the method of any of Examples 20-38.

Example 41 includes a computing device comprising means for performing the method of any of Examples 20-38.

The invention claimed is:

1. A service template generator for managing service templates, the service template generator comprising:
a service generation module to:
access a generic service template, the generic service template defining a service topology to be provided by one or more datacenter nodes of a datacenter;
access a service level agreement (SLA) metric specification, the SLA metric specification specifying a set of SLA metrics to be satisfied by the service topology; and
generate one or more specific service templates based on the generic service template, each of the specific service templates to provide an SLA metric within the set of SLA metrics of the SLA metric specification, wherein to generate the one or more specific service templates comprises to (i) apply a service configuration policy to the generic service template to satisfy the SLA metric within the set of SLA metrics of the SLA metric specification, (ii) model the service topology based on the service configuration policy applied to the generic service template, (iii) determine a modeled SLA metric based on the modeled service topology, and (iv) compare the modeled SLA metric to the set of SLA metrics of the SLA metric specification; and
a service template catalog to store the one or more specific service templates, the service template catalog to be accessible to the datacenter.

2. The service template generator of claim 1, wherein to generate the one or more specific service templates comprises to specify a platform hardware feature of a datacenter node.

3. The service template generator of claim 2, wherein the platform hardware feature comprises a processor architecture, an instruction set, a virtual I/O capability, a trusted execution capability, a cache size, a processor security feature, or a disk I/O capability.

4. The service template generator of claim 1, wherein to generate the one or more specific service templates comprises to modify the generic service template with an additional datacenter requirement, wherein to modify the generic service template comprises to extend an open virtualization format (OVF) package or an OVF descriptor associated with the generic service template.

5. The service template generator of claim 1, further comprising a resource pool module to determine available resources of the datacenter;
wherein to generate the one or more specific service templates comprises to restrict the specific service templates to the available resources of the datacenter.

6. The service template generator of claim 1, further comprising:
a service selection module to (i) receive a service request including an SLA requirement and (ii) select a service template from the service template catalog based on the service request, the selected service template to provide an SLA metric corresponding to the SLA requirement of the service request; and
a service management module to deploy the selected service template using available resources of the datacenter.

7. The service template generator of claim 6, wherein the service selection module is further to:

determine whether any service templates providing an SLA metric corresponding to the SLA requirement exist in the service template catalog; and negotiate an updated SLA requirement with a customer computing device in response to a determination that no service templates providing the SLA metric corresponding to the SLA requirement exist in the service template catalog, wherein the updated SLA requirement includes a reduced SLA metric to be provided by the service topology relative to the SLA requirement of the service request.

8. The service template generator of claim 6, further comprising a resource pool module to determine whether resources specified by the selected service template are available in the datacenter;

wherein to deploy the selected service template using the available resources of the datacenter comprises to deploy the selected service template in response to a determination that the resources specified by the selected service template are available in the datacenter.

9. The service template generator of claim 8, wherein to determine whether the resources specified by the selected service template are available in the datacenter comprises to determine whether a datacenter node is available in the datacenter, wherein to determine whether the datacenter node is available comprises to determine whether a datacenter node having a platform hardware feature specified by the selected service template is available in the datacenter.

10. A method for managing service templates, the method comprising:

accessing, by a service template generator, a generic service template, the generic service template defining a service topology to be provided by one or more datacenter nodes of a datacenter;

accessing, by the service template generator, a service level agreement (SLA) metric specification, the SLA metric specification specifying a set of SLA metrics to be satisfied by the service topology;

generating, by the service template generator, one or more specific service templates based on the generic service template, each of the specific service templates to provide an SLA metric within the set of SLA metrics of the SLA metric specification, wherein generating the one or more specific service templates comprises (i) applying a service configuration policy to the generic service template to satisfy the SLA metric within the set of SLA metrics of the SLA metric specification, (ii) modeling the service topology based on the service configuration policy applied to the generic service template, (iii) determining a modeled SLA metric based on the modeled service topology, and (iv) comparing the modeled SLA metric to the set of SLA metrics of the SLA metric specification; and storing, by the service template generator, the one or more specific service templates in a service template catalog, the service template catalog to be accessible to the datacenter.

11. The method of claim 10, wherein generating the one or more specific service templates comprises specifying a platform hardware feature of a datacenter node.

12. The method of claim 10, further comprising determining, by the service template generator, available resources of the datacenter;

wherein generating the one or more specific service templates comprises restricting the specific service templates to the available resources of the datacenter.

13. The method of claim 10, further comprising:

receiving, by the service template generator, a service request including an SLA requirement;

selecting, by the service template generator, a service template from the service template catalog based on the service request, the selected service template to provide an SLA metric corresponding to the SLA requirement of the service request; and deploying, by the service template generator, the selected service template using available resources of the datacenter.

14. The method of claim 13, further comprising determining, by the service template generator, whether resources specified by the selected service template are available in the datacenter;

wherein deploying the selected service template using the available resources of the datacenter comprises deploying the selected service template in response to determining that the resources specified by the selected service template are available in the datacenter.

15. The method of claim 14, wherein determining whether the resources specified by the selected service template are available in the datacenter comprises determining whether a datacenter node is available in the datacenter, wherein determining whether the datacenter node is available comprises determining whether a datacenter node having a platform hardware feature specified by the selected service template is available in the datacenter.

16. One or more non-transitory, computer-readable storage media comprising a plurality of instructions that in response to being executed cause a service template generator to:

access a generic service template, the generic service template defining a service topology to be provided by one or more datacenter nodes of a datacenter;

access a service level agreement (SLA) metric specification, the SLA metric specification specifying a set of SLA metrics to be satisfied by the service topology;

generate one or more specific service templates based on the generic service template, each of the specific service templates to provide an SLA metric within the set of SLA metrics of the SLA metric specification, wherein to generate the one or more specific service templates comprises to (i) apply a service configuration policy to the generic service template to satisfy the SLA metric within the set of SLA metrics of the SLA metric specification, (ii) model the service topology based on the service configuration policy applied to the generic service template, (iii) determine a modeled SLA metric based on the modeled service topology, and (iv) compare the modeled SLA metric to the set of SLA metrics of the SLA metric specification; and store the one or more specific service templates in a service template catalog, the service template catalog to be accessible to the datacenter.

17. The one or more non-transitory, computer-readable storage media of claim 16, wherein to generate the one or more specific service templates comprises to specify a platform hardware feature of a datacenter node.

18. The one or more non-transitory, computer-readable storage media of claim 16, further comprising a plurality of instructions that in response to being executed cause the service template generator to determine available resources of the datacenter;

wherein to generate the one or more specific service templates comprises to restrict the specific service templates to the available resources of the datacenter.

19. The one or more non-transitory, computer-readable storage media of claim 16, further comprising a plurality of instructions that in response to being executed cause the service template generator to:
   receive a service request including an SLA requirement;
   select a service template from the service template catalog based on the service request, the selected service template to provide an SLA metric corresponding to the SLA requirement of the service request; and
   deploy the selected service template using available resources of the datacenter.

20. The one or more non-transitory, computer-readable storage media of claim 19, further comprising a plurality of instructions that in response to being executed cause the service template generator to determine whether resources specified by the selected service template are available in the datacenter;
   wherein to deploy the selected service template using the available resources of the datacenter comprises to deploy the selected service template in response to determining that the resources specified by the selected service template are available in the datacenter.

21. The one or more non-transitory, computer-readable storage media of claim 20, wherein to determine whether the resources specified by the selected service template are available in the datacenter comprises to determine whether a datacenter node is available in the datacenter, wherein to determine whether the datacenter node is available comprises to determine whether a datacenter node having a platform hardware feature specified by the selected service template is available in the datacenter.

* * * * *